United States Patent
Yin et al.

(10) Patent No.: US 9,712,003 B2
(45) Date of Patent: Jul. 18, 2017

(54) MOTOR OF A CEILING FAN WITH LINKING SEAT COUPLING TO THE STATOR CORE

(71) Applicant: Sunonwealth Electric Machine Industry Co., Ltd., Kaohsiung (TW)

(72) Inventors: Tso-Kuo Yin, Kaohsiung (TW); Duo-Nian Shan, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 347 days.

(21) Appl. No.: 14/525,350

(22) Filed: Oct. 28, 2014

(65) Prior Publication Data
US 2015/0180290 A1 Jun. 25, 2015

(30) Foreign Application Priority Data
Dec. 24, 2013 (TW) .............................. 102148022 A

(51) Int. Cl.
*H02K 1/18* (2006.01)
*H02K 3/52* (2006.01)

(52) U.S. Cl.
CPC ............. *H02K 1/187* (2013.01); *H02K 3/522* (2013.01); *H02K 2203/12* (2013.01)

(58) Field of Classification Search
CPC .... H02K 1/187; H02K 3/522; H02K 2203/12; H02K 11/33; H02K 21/22; F04D 25/088
USPC .............................................. 310/91
See application file for complete search history.

(56) References Cited

U.S. PATENT DOCUMENTS

| 7,615,898 B2 | 11/2009 | Chang | |
|---|---|---|---|
| 2010/0109465 A1* | 5/2010 | Yang | H02K 11/33 310/156.12 |

FOREIGN PATENT DOCUMENTS

| CN | 2525720 Y | 12/2002 | |
|---|---|---|---|
| CN | 201865944 U * | 6/2011 | ............... H02K 1/12 |

OTHER PUBLICATIONS

Machine translation of CN 201865944 U (Jun. 2011).*

* cited by examiner

*Primary Examiner* — Michael Andrews
(74) *Attorney, Agent, or Firm* — Alan D. Kamrath; Kamrath IP Lawfirm, P.A.

(57) ABSTRACT

A motor of a ceiling fan includes a stator, a shaft, a linking seat, and a rotor. The stator has a core with an assembly hole. The linking seat couples with the core and has an axial hole in alignment with the assembly hole in an axial direction of the shaft firmly resting in the axial hole. The rotor is rotatably arranged around the shaft.

7 Claims, 6 Drawing Sheets

MOTOR OF A CEILING FAN WITH LINKING SEAT COUPLING TO THE STATOR CORE

BACKGROUND OF THE INVENTION

1. Field of the Invention

The present invention generally relates to a motor of a ceiling fan and, more particularly, to a motor equipped with a linking seat for a shaft to mount thereon.

2. Description of the Related Art

Referring to FIG. 1, a conventional motor of a ceiling fan with a reference number of "9," a Taiwan publication number of I326959, and entitled as "DC Brushless Motor for A Ceiling Fan with Improved Stator and Rotor" is shown, which includes a stator 91 and a rotor 92. The stator 91 has a core 911, a plurality of coils 912 wound on the core 911, and a shaft 913 passing through the core 911. The rotor 92 has an upper shield 921, a lower shield 922 and a waist ring 923 sandwiched by the upper and lower shields 921, 922. Each of the upper and lower shields 921, 922 combines with a bearing 924 for the shaft 913 to couple with, and the stator 91 is received in a room defined by the upper shield 921, lower shield 922 and waist ring 923.

Referring to FIG. 2, the core 911 of the stator 91 of the conventional motor 9 is made by magnetic conducting material, and there is a through hole 911a located at and axially penetrating a center part 911b of the core 911 for the shaft 913 to pass through. The core 911 further includes a plurality of pole columns 911c radially extending outwards from an outer periphery of the center part 911b upon which the coils 912 are wound. Conventionally, in order to couple the shaft 913 with the core 911 by a press fit, the bore of the through hole 911a has to be equal to or slightly smaller than the diameter of the shaft 913. However, since the diameter of the shaft 913 is usually small, the periphery of the through hole 911a is usually much smaller than the outer periphery of the center part 911b. Therefore, the radial thickness of the center part 911b between the outer periphery thereof and the through hole 911a is large, and, thus, the center part 911b is also heavy. Therefore, there are drawbacks of the core 911, such as heavy weight and high cost.

Moreover, heat generated by the core 911 and coils 912 is liable to accumulate in the shaft 913 and hard to be dissipated due to the press fit between the shaft 913 and core 911 and the total sealing of the through hole 911a by the shaft 913. As a result and with the stator 91 disadvantageous in cooling, a high-temperature situation of the conventional motor 9 can result after a long operation time, thus raising the failure rate of the conventional motor 9.

As a result, since the conventional motor 9 for a ceiling fan has drawbacks, such as the "core 911 being heavy in weight," "high manufacturing cost" and "low efficiency in cooling," it is necessary to improve the conventional motor 9.

SUMMARY OF THE INVENTION

It is therefore the objective of this invention to provide a motor of a ceiling fan, which has a linking seat arranged between a shaft and a core. The core has an assembly hole, and the linking seat has an axial hole. The shaft can extend through the axial hole in order to couple with the core via the linking seat. As such, the diameter of the assembly hole may be larger than that of the axial hole, advantageously reducing the manufacturing cost and weight of the motor of the ceiling fan.

Another objective of this invention is to provide a motor of a ceiling fan, which has a linking seat arranged between a shaft and a core to keep a gap between the core and the shaft, improving cooling efficiency of the motor of the ceiling fan.

One embodiment of the invention discloses a motor of a ceiling fan, which includes a stator, a shaft, a linking seat, and a rotor. The stator has a core with an assembly hole. The linking seat couples with the core and has an axial hole in alignment with the assembly hole in an axial direction of the shaft firmly resting in the axial hole. The rotor is rotatably arranged around the shaft.

In a preferred form shown, the stator further comprises two insulated bobbins, and each insulated bobbin has a first coupling portion. The two insulated bobbins connect with two opposite sides of the core respectively, and the linking seat has a second coupling portion in alignment and coupled with the first coupling portions of the insulated bobbins to connect the linking seat with the core.

In the preferred form shown, each of the insulated bobbins has a passageway, and the assembly hole, the passageways of the insulated bobbins, and the axial hole of the linking seat align with each other in the axial direction of the shaft for the shaft to pass through.

In the preferred form shown, bores of both passageways are larger than a bore of the axial hole.

In the preferred form shown, for each insulated bobbin, there is a positioning portion surrounding the passageway, extending into the assembly hole of the core, and coupling with the core.

In the preferred form shown, each of the first coupling portions of the insulated bobbins comprises a plurality of through holes, the second coupling portion of the linking seat. comprises a plurality of fixing holes aligning with the through holes respectively, and a plurality of fixing members pass through the through holes and fixing holes to couple therein.

In the preferred form shown, the stator couples with a base having an aperture, and the linking seat further has an opening communicating with the assembly hole of the core and the aperture of the base.

In the preferred form shown, a bore of the assembly hole is larger than a bore of the axial hole.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
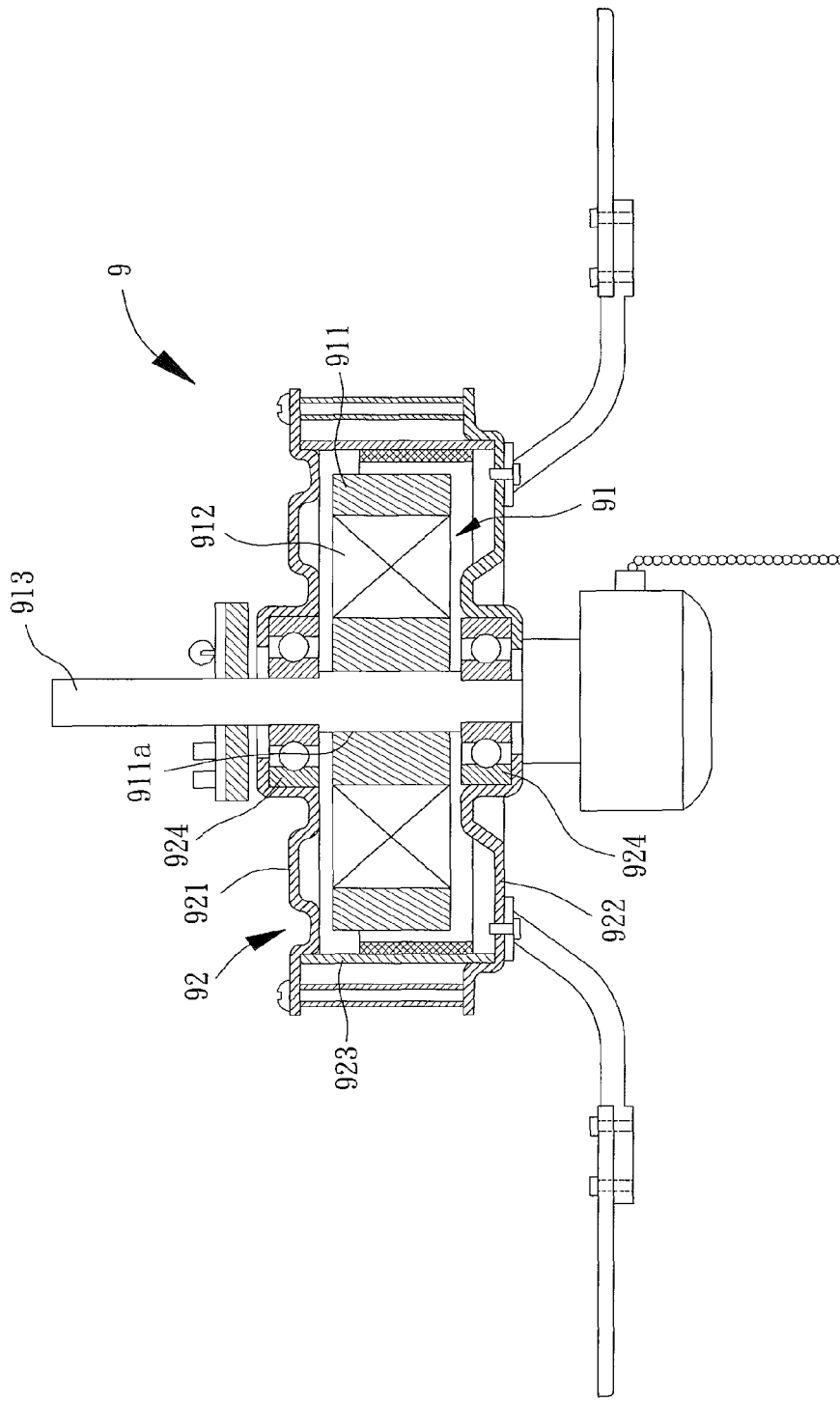
FIG. 1 is a cross-sectional view of a conventional motor of a ceiling fan.
Figure 2:
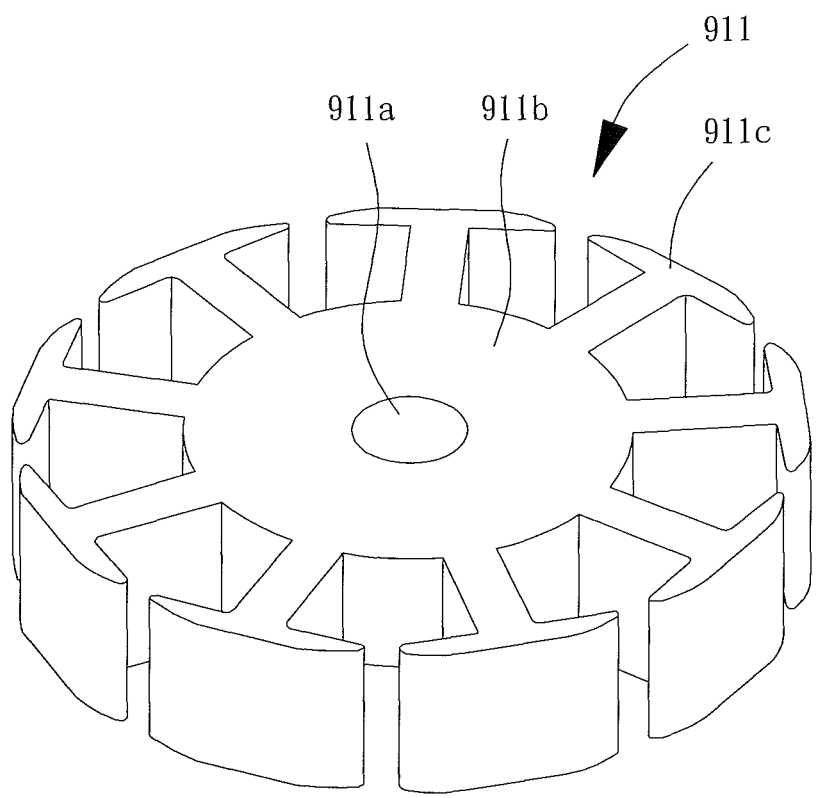
FIG. 2 is a perspective view of a core of the conventional motor of the ceiling fan.

In the various figures of the drawings, the same numerals designate the same or similar parts. Furthermore, when the term "first," "second," "inner," "outer," "beneath," "above" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

Figure 3:
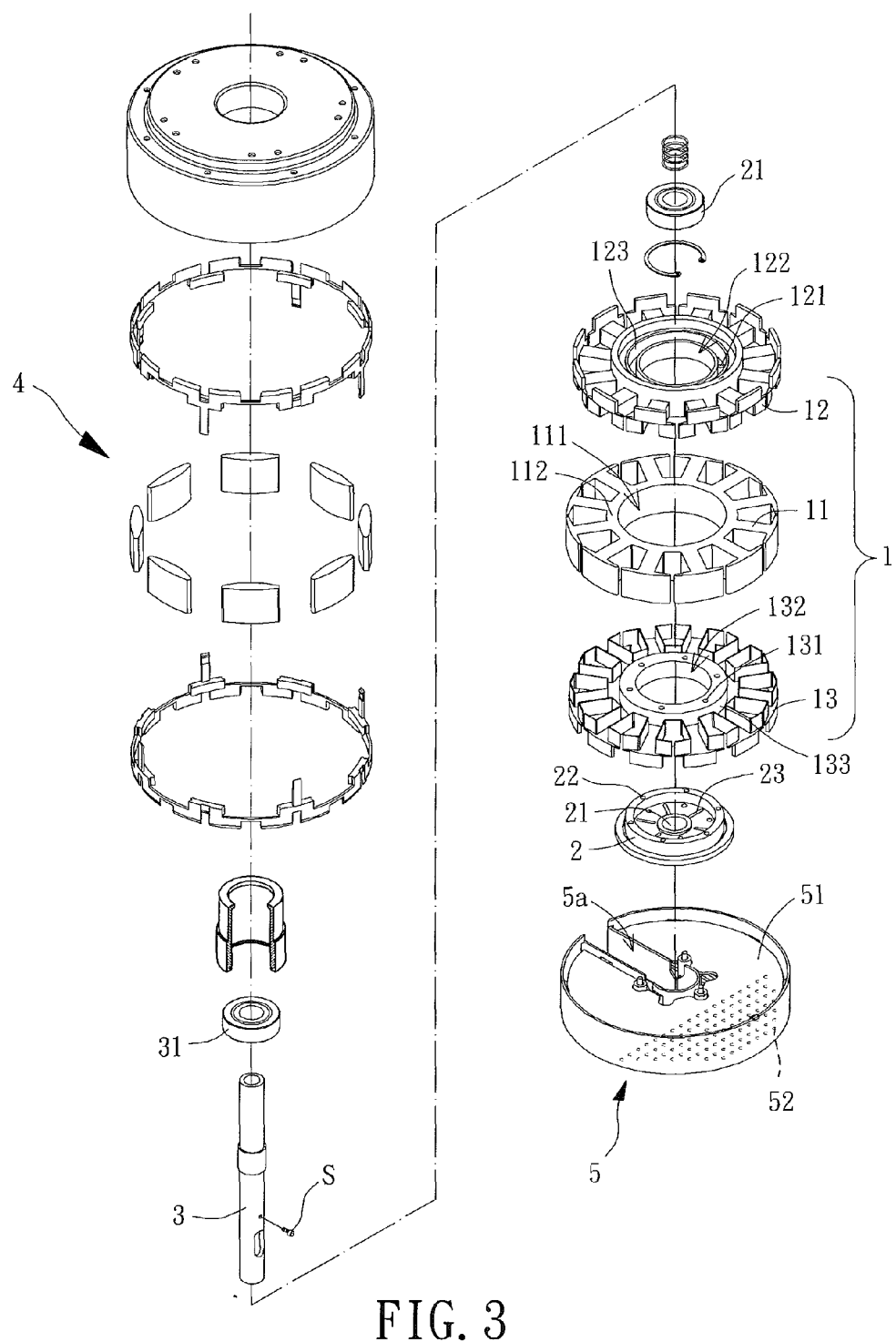
FIG. 3 is an exploded and perspective view of a motor of a ceiling fan according to a first embodiment of the invention.
Figure 4:
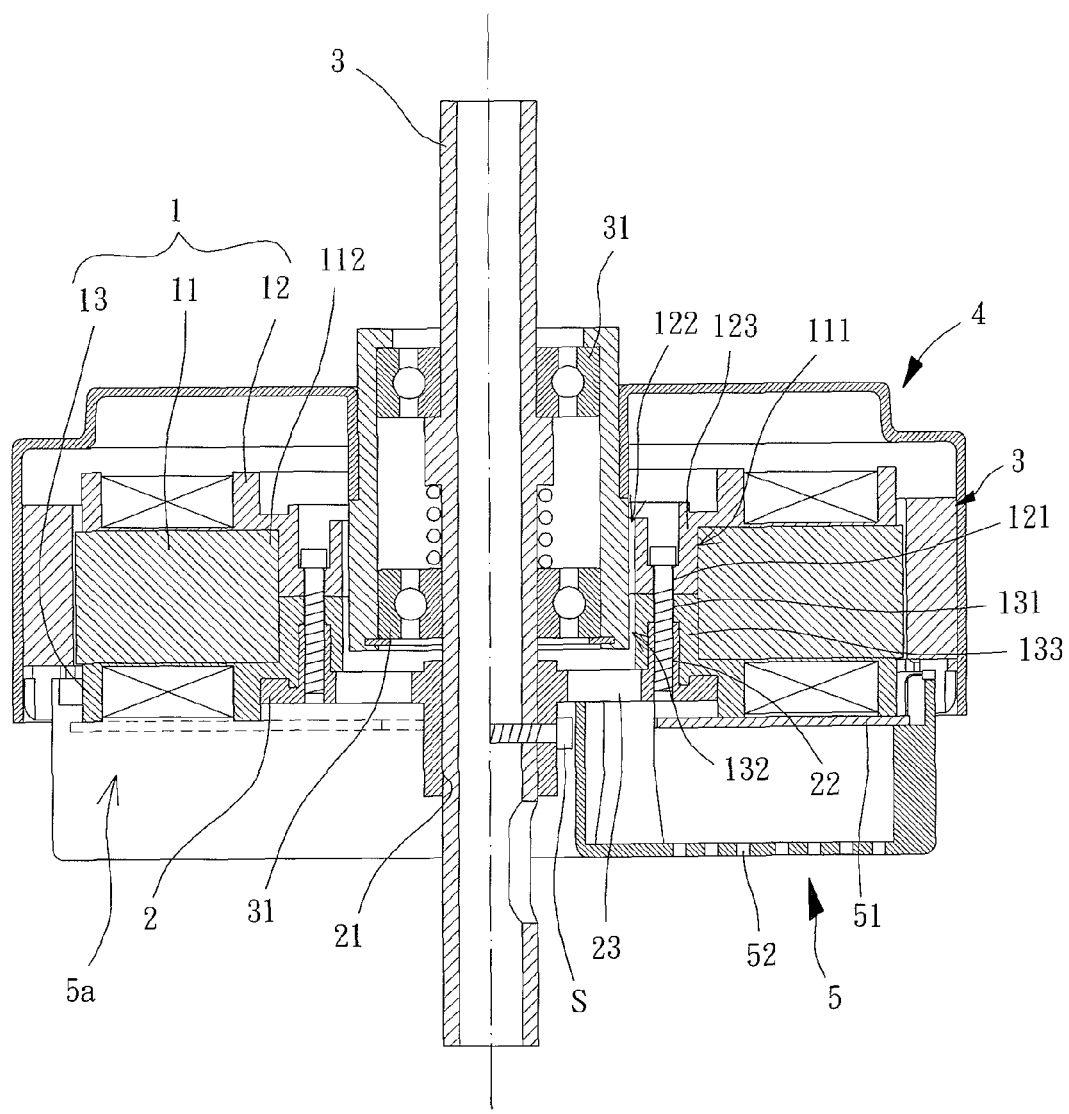
FIG. 4 is a cross-sectional view of the motor according to the first embodiment.

Referring to FIGS. 3-4, a first embodiment of a motor of a ceiling fan of the present invention is shown. The motor of this embodiment includes a stator 1, a linking seat 2, a shaft 3 and a rotor 4. The stator 1 is mounted on the linking seat 2, the shaft 3 extends through and connects with the linking seat 2, and the rotor 4 is rotatably arranged around the shaft 3.

The stator 1 has a core 11 formed by magnetic conducting material, such as a plurality of laminated silicon-steel plates or an integrated block. The core 11 has an assembly hole 111 located at and axially penetrating a center part 112 of the core 11. The linking seat 2 couples with the core 11 of the stator 1. Preferably the linking seat 2 inserts into the assembly hole 111 to firmly fix the core 11. The linking seat 2 further includes an axial hole 21 in alignment with the assembly hole 111 in an axial direction of the shaft 3, with the bore of the assembly hole 111 being larger than that of the axial hole 21. As a result, the shaft 3 can firmly rest in the axial hole 21 of the linking seat 2. Specifically, the bore of the axial hole 21 is equal to or slightly larger than an outer diameter of the shaft 3, so that the shaft 3 can extend through the axial hole 21 and couple with the linking seat 2 by a loose fit. Additionally, a fixing member "S" or other conventional coupling structure is used to firmly position the shaft 3 in the axial hole 21. When this motor of a ceiling fan is in use, the shaft 3 is fixed to the ceiling, with the core 11 of the stator 1 coupling with the shaft 3 through the linking seat 2. Furthermore, there is a bearing 31 arranged around the shaft 3 and coupling with a periphery of the shaft 3 by an inner side, and an outer side of the bearing 31 couples with the rotor 4, so that the rotor 4 is able to rotate around the shaft 3.

With the above illustrated structure of this embodiment of the invention, through the linking seat 2 firmly receiving the shaft 3 by the axial hole 21 and coupling with the core 11 by preferably being inserted into the assembly hole 111, the shaft 3 can couple with the inner wall of the axial hole 21 of the linking seat 2 to connect with the core 11 via the linking seat 2. Accordingly, even though the bore of the axial hole 21 has to be equal to or slightly larger than the outer diameter of the shaft 3, the bore of the assembly hole 111 can be larger than that of the axial hole 21 and need not to match the outer diameter of the shaft 3 since the shaft 3 couples with the core 11 through the linking seat 2. As a result, the assembly hole 111 can be enlarged by having the linking seat 2 with a large outer periphery, thus largely decreasing the weight and radial thickness of the center part 112 of the core 11, and lowering the manufacturing cost and weight of the motor of a ceiling fan. Moreover, the shaft 3 does not totally seal the assembly hole 111 of the core 11 since the bore of the assembly hole 111 is larger than that of the axial hole 21. In other words, there is a gap between the core 11 and the shaft 3 for the operational heat generated in the stator 1 to be dissipated via the gap. Therefore, the motor of this embodiment of the present invention can have an improved cooling efficiency.

Figure 5:
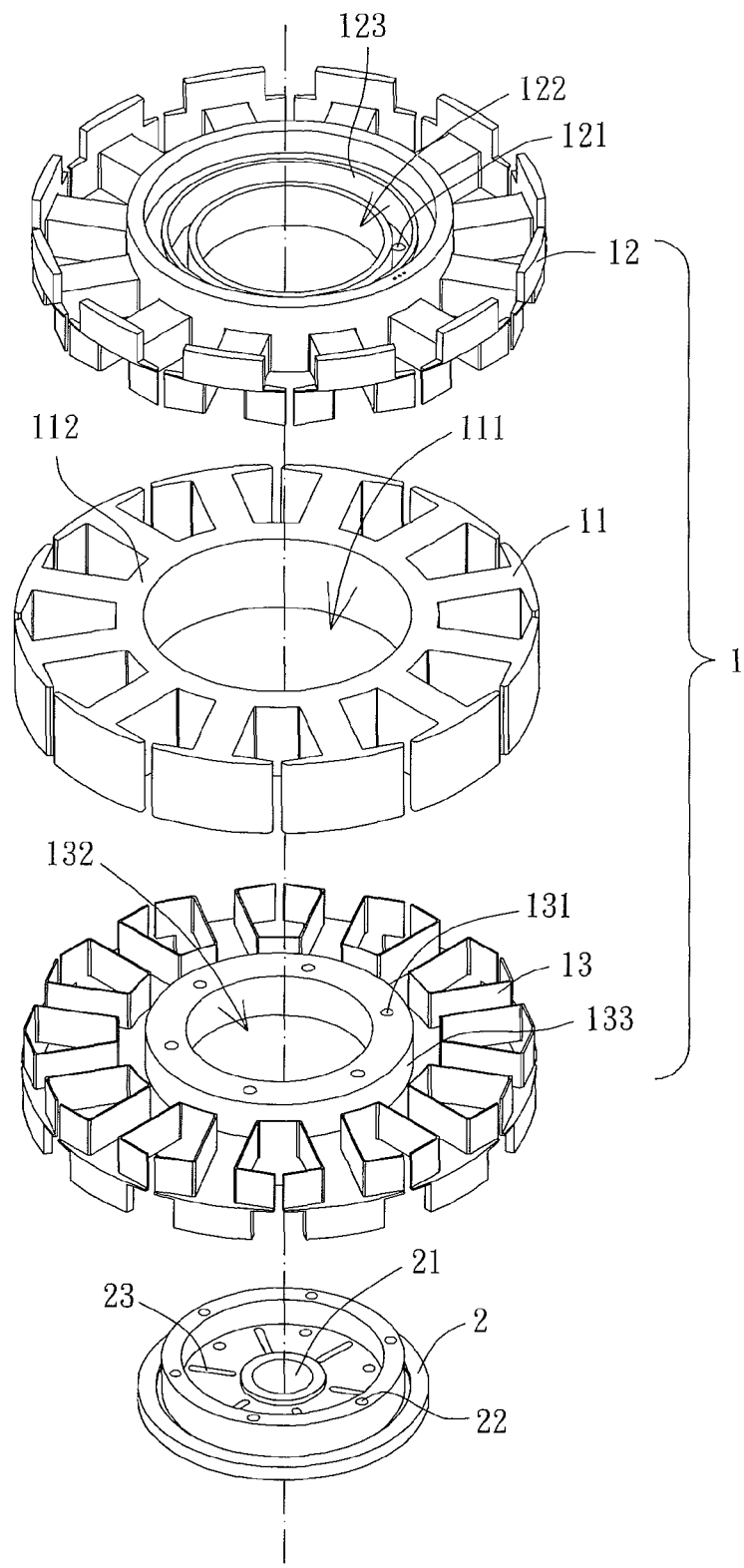
FIG. 5 is an exploded and perspective view of a stator and a linking seat of the motor according to the first embodiment.

Referring to FIGS. 4 and 5, FIG. 5 shows a perspective view of the stator 1 and linking seat 2, and the stator 1 can further include two insulated bobbins 12, 13. The insulated bobbin 12 has a first coupling portion 121 as well as the insulated bobbin 13 also has a first coupling portion 131. These two insulated bobbins 12, 13 connect with two opposite sides of the core 11 respectively to position the core 11. Correspondingly, the linking seat 2 has a second coupling portion 22, which is preferably formed in a part of the linking seat 2 inside the assembly hole 111, in alignment and able to be coupled with the first coupling portions 121, 131 of the insulated bobbins 12, 13 for coupling the linking seat 2 with the core 11. Specifically, each of the insulated bobbins 12, 13 has a passageway 122 or 132, and the passageways 122, 132 and the axial hole 21 of the linking seat 2 align with each other in the axial direction of the shaft 3 for the shaft 3 to pass through. Preferably, bores of both passageways 122, 132 are larger than that of the axial hole 21, to maintain gaps between the shaft 3 and the insulated bobbins 12, 13. Furthermore, it is preferable that there are a positioning portion 123 surrounding the passageway 122 of the insulated bobbin 12 and a positioning portion 133 surrounding the passageway 132 of the insulated bobbin 13. Specifically, the positioning portions 123, 133 extend into the assembly hole 111 of the core 11 and preferably couple with the core 11 to fix the core 11.

Preferably, each of the first coupling portions 121, 131 of the insulated bobbins 12, 13 includes a plurality of through holes, while the second coupling portion 22 of the linking seat 2 is a plurality of fixing holes that is constructed by either through holes or blind holes. The through holes serving as the first coupling portions 121, 131. align with the fixing holes serving as the second coupling portion 22 for fixing members to pass through and to couple therein. Accordingly, with the fixing members firmly coupling within and sequentially passing through the first coupling portions 121, 131 and the second coupling portion 22, and since the insulated bobbins 12, 13 can oppositely clamp and position the core 11 for a preferable performance in positioning of the core 11, the connection between the linking seat 2 and core 11 is strong.

Referring to FIGS. 3 and 4 again, the stator 1 may couple with a base 5. Particularly, a side of the core 11 of the stator 1, by which the core 11 couples with the linking seat 2, couples with the base 5, so that the linking seat 2 is positioned between the stator 1 and the base 5. The base 5 has a circuit board 51 received inside a case of the base 5, with the circuit board 51 being adapted to control the motor of a ceiling fan. Furthermore, there is an aperture 52 formed in the case of the base 5 to connect inner and outer portions of said case for dissipating the heat generated inside the case of the base 5. Preferably, the linking seat 2 further has an opening 23 between the assembly hole 111 of the core 11 and the aperture 52 of the base 5 for the assembly hole 111 to communicate with the aperture 52 via the opening 23. Accordingly, the heat generated inside the stator 1 in operation can be dispelled by a route passing through the assembly hole 111, opening 23 and aperture 52, and, thus, the motor in operation is prevented from overheating. When this motor of the ceiling fan is in use, the shaft 3 is fixed to the ceiling with an end for the base 5 to be positioned lower than the rotor 4, so that there is sufficient distance between the base 5 and the ceiling where the shaft 3 connects with. Thus the heat inside the motor can be expelled via the aperture 52 smoothly.

Additionally, since the circuit board 51 usually has a relatively higher failure rate than other elements of the motor, it is preferable that the base 5 can be easily detached from the motor. Therefore, the base 5 may be detachably coupled with the stator 1 and further has a guiding groove 5a extending in a radial direction of the shaft 3 to shape the base 5 into a C-shape, as shown in FIG. 3, for the shaft 3 to be disengaged from the base 5 via the guiding groove 5a. Accordingly, as long as the circuit board 51 of the base 5 is a module able to be separated from the base 5, the user can easily detach the base 5 from the stator 1, separate the shaft 3 from the base 5 via the guiding groove 5a, and replace the circuit board 51 by a new one (or temporarily remove the circuit board 51 for repair purposes). Therefore, convenience in maintenance and repair for this motor is improved.

In sum, in the above embodiment, since the linking seat 2 inserts into the assembly hole 111 to couple with the core 11 of the stator 1 and the linking seat 2 further includes the axial hole 21 in alignment with the assembly hole 111 in the axial direction of the shaft 3 for the shaft 3 to extend through, the shaft 3 can connect with the core 11 through the linking seat 2. Accordingly, the bore of the assembly hole 111 is larger than the bore of the axial hole 21. Thus the weight and radial thickness of the center part 112 can be largely decreased, to lower the manufacturing cost and weight of the motor of the ceiling fan as well as improving the cooling efficiency thereof.

Figure 6:
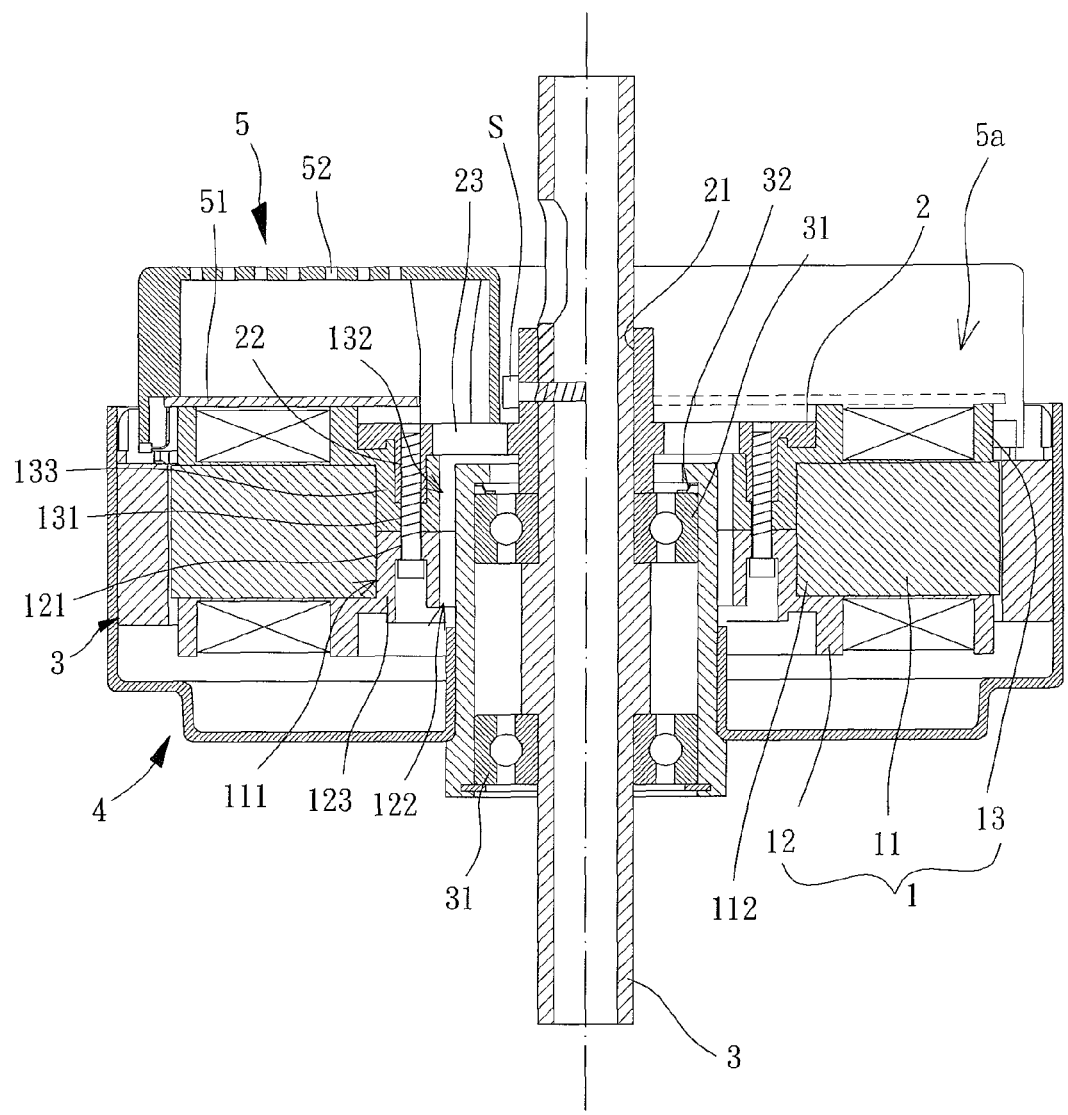
FIG. 6 is a cross-sectional view of a motor of a ceiling fan according to a second embodiment of the invention.

Please refer to FIG. 6 now, which illustrates a second embodiment of the motor of a ceiling fan. The difference between this motor and that of the first embodiment lies in that, when the motor of this second embodiment is in use, the base 5 is beneath the ceiling, and the rotor 4 is beneath the base 5. Therefore, there is a distance between the rotor 4 and the ceiling, where the shaft 3 connects with, large enough for the blades of the rotor 4 to smoothly guide air, to improve the performance in air propelling. In this embodiment, in addition to the bearing 31 arranged around the shaft 3 for supporting the rotor 4, there is an elastic member 32 between the bearing 31 and rotor 4. Specifically, the elastic member 32 is a spring washer or other conventional elastic structure with a buffering function that abuts against the bearing 31 and the rotor 4 by two axial ends respectively, to suppress the vibration caused by rotation of the rotor 4 in operation and prevent this vibration from transmitting to the shaft 3 via the bearing 31 to affect the operation of the stator 1 or base 5.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A motor of a ceiling fan, comprising:
   a stator including a core having an assembly hole, wherein the stator further comprises two insulated bobbins, wherein each of the two insulated bobbins has a first coupling portion, and wherein the two insulated bobbins connect with two opposite sides of the core, respectively;
   a shaft;
   a linking seat coupled with the core and having as axial hole in alignment with the assembly hole in an axial direction of the shaft firmly resting in the axial hole, wherein the linking seat has a second coupling portion in alignment and coupled with the first coupling portions of the two insulated bobbins to connect the linking seat with the core; and
   a rotor rotatably arranged around the shaft.

2. The motor of the ceiling fan as claimed in claim 1, wherein each of the two insulated bobbins has a passageway, and wherein the assembly hole, the passageways of the two insulated bobbins, and the axial hole of the linking seat align with each other in the axial direction of the shaft for the shaft to pass through.

3. The motor of the ceiling fan as claimed in claim 2, wherein the passageway of each of the two insulated bobbins has a bore larger than a bore of the axial hole.

4. The motor of the ceiling fan as claimed in claim 2, wherein a positioning portion surrounds the passageway of each of the two insulated bobbins, extends into the assembly hole of the core, and couples with the core.

5. The motor of the ceiling fan as claimed in claim 1, wherein each of the first coupling portions of the two insulated bobbins comprises a plurality of through holes, wherein the second coupling portion of the linking seat comprises a plurality of fixing holes aligning with the plurality of through holes, respectively, and wherein a plurality of fixing members passes through the plurality of through holes and the plurality of fixing holes to couple therein.

6. The motor of the ceiling fan as claimed in claim 1, wherein the stator couples with a base having an aperture, and wherein the linking seat further has an opening communicating with the assembly hole of the core and the aperture of the base.

7. The motor of the ceiling fan as claimed in claim 1, wherein a bore of the assembly hole is larger than a bore of the axial hole.

* * * * *